(12) United States Patent
Hsu

(10) Patent No.: US 8,123,206 B2
(45) Date of Patent: Feb. 28, 2012

(54) CUTTING BOARD WITH PIVOTAL BASE STAND

(76) Inventor: Junior Hsu, Northbrook, IL (US)

( * ) Notice: Subject to any disclaimer, the term of this patent is extended or adjusted under 35 U.S.C. 154(b) by 517 days.

(21) Appl. No.: 12/456,191

(22) Filed: Jun. 12, 2009

(65) Prior Publication Data

US 2009/0250860 A1   Oct. 8, 2009

Related U.S. Application Data

(63) Continuation-in-part of application No. 11/479,255, filed on Jun. 30, 2006.

(51) Int. Cl.
*B23Q 3/00* (2006.01)

(52) U.S. Cl. .................. 269/289 R; 269/302.1

(58) Field of Classification Search .............. 269/289 R, 269/302.1, 901, 60, 71; 248/97, 346.3, 188.7, 248/188.6, 186.1, 462, 474, 150, 472, 145, 248/460, 473; 40/747, 748, 606.14, 606.18, 40/606.15

See application file for complete search history.

(56) References Cited

U.S. PATENT DOCUMENTS

| | | |
|---|---|---|
| 780,052 A | 1/1905 | Mohlberg |
| 1,864,077 A | 6/1932 | Lewis et al. |
| 2,189,687 A | 2/1940 | Thomas |
| 4,127,948 A | 12/1978 | Goy Yu Chin et al. |
| 4,545,768 A | 10/1985 | Hinnen |
| 5,022,620 A | 6/1991 | Scott |
| 5,031,683 A | 7/1991 | Marvy et al. |
| 5,054,507 A | 10/1991 | Sparks |
| D321,799 S | 11/1991 | Marvy et al. |
| 5,085,416 A | 2/1992 | Miyake et al. |
| 5,399,140 A | 3/1995 | Klippel |
| 5,402,988 A | 4/1995 | Eisele |
| 5,419,065 A | 5/1995 | Lin |
| 5,996,983 A | 12/1999 | Laurenzi |
| 6,257,559 B1 | 7/2001 | Mouri |
| 6,676,113 B2 | 1/2004 | Christensen et al. |
| 6,789,792 B1 * | 9/2004 | Angland .................. 269/289 R |
| 6,939,021 B2 | 9/2005 | Leslie et al. |
| 7,040,611 B2 | 5/2006 | Poynton |
| 7,942,395 B2 * | 5/2011 | Okada ................... 269/289 R |
| 2008/0001337 A1 | 1/2008 | Hsu |

* cited by examiner

*Primary Examiner* — Lee D Wilson
(74) *Attorney, Agent, or Firm* — Olson & Cepuritis, Ltd.

(57) ABSTRACT

A cutting board apparatus with a planar cutting surface and a stand pivotally mounted thereto. The stand supports the cutting board apparatus in a generally vertical position to facilitate frequent washing and drainage for healthier food processing.

15 Claims, 2 Drawing Sheets

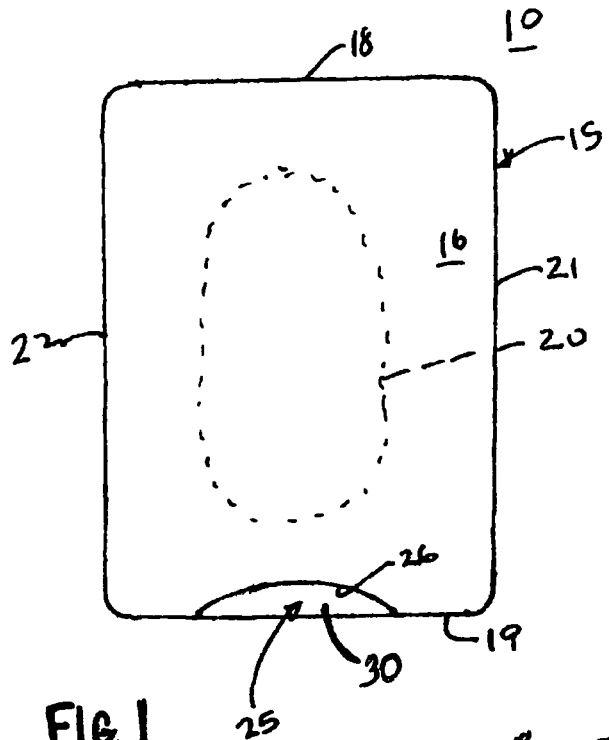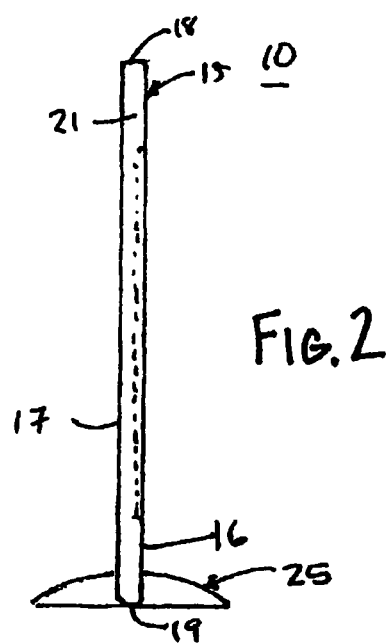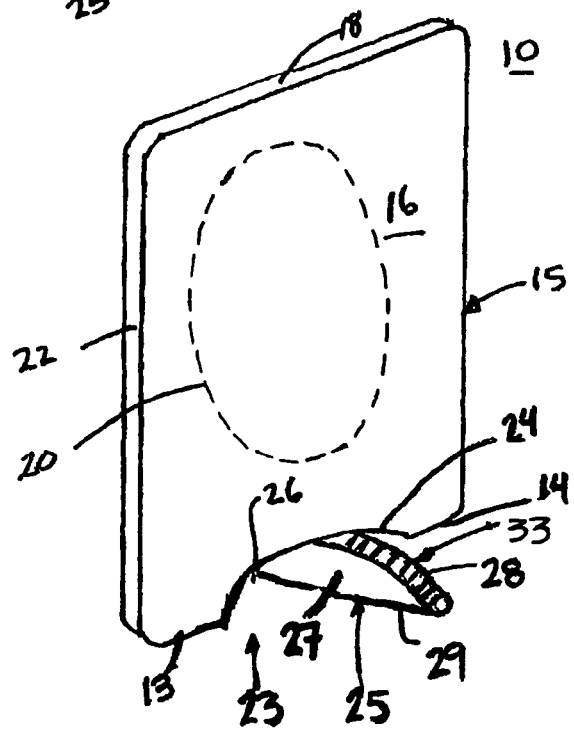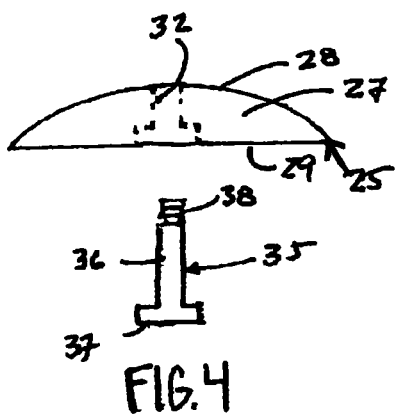

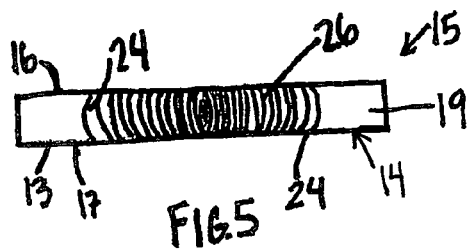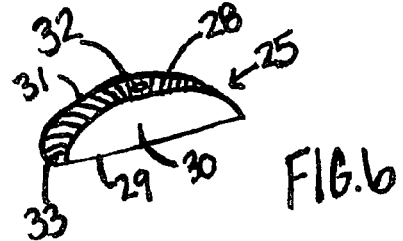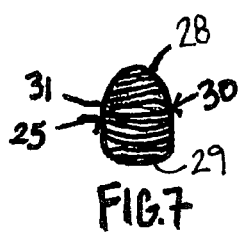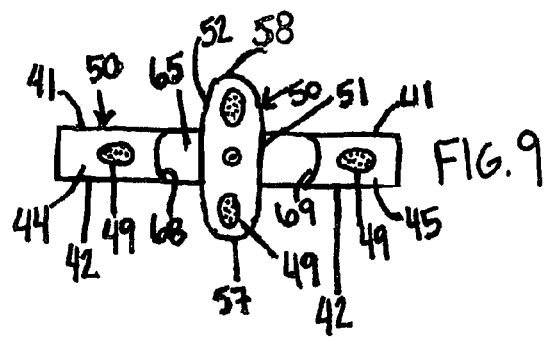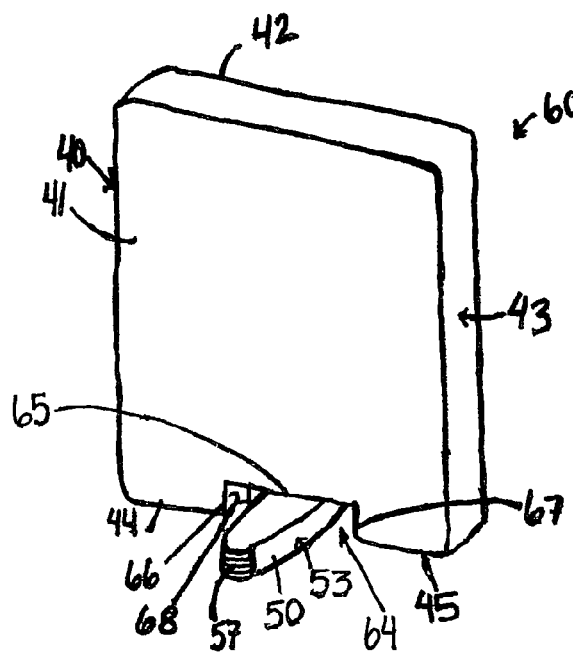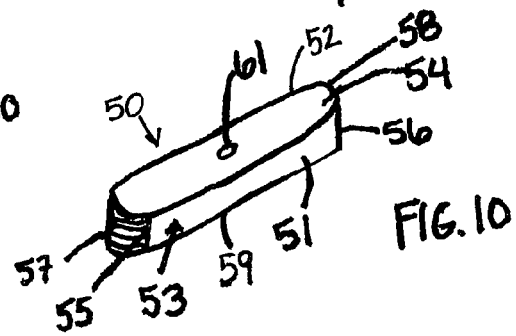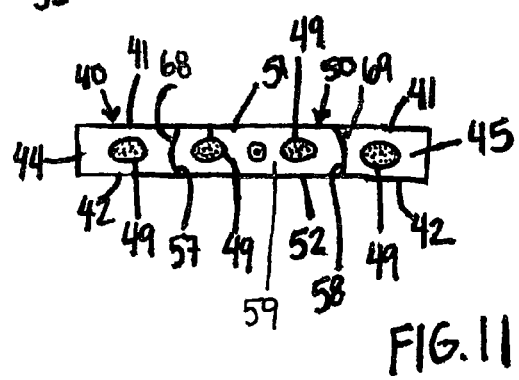

CUTTING BOARD WITH PIVOTAL BASE STAND

CROSS-REFERENCE TO RELATED APPLICATION

This application is a continuation-in-part of U.S. Ser. No. 11/479,255 filed Jun. 30, 2006, the entire disclosure of which is incorporated herein by reference.

FIELD OF THE INVENTION

This invention relates to a cutting board of the type commonly found in the home used for cutting various food items including, but not limited to poultry, meats, vegetables, fruits and the like.

BACKGROUND OF THE INVENTION

Much has been written lately about the dangers of preparing raw food, particularly poultry, but including pork and meat without carefully washing the surfaces on which the food is prepared. Now, publications and television programs have also indicated that fruits and vegetables can also transmit undesirable organisms and, therefore, it is extremely important for cutting boards and other work surfaces to be carefully and frequently washed and disinfected, both during and after use. Particularly, in preparing a meal, if poultry, fish or meat is prepared on a cutting board and thereafter fruits or vegetables are also prepared on the cutting board without intervening washing, there is a real likelihood that dangerous organisms such as *E. coli* or others can be transmitted unknowingly to the food.

SUMMARY OF THE INVENTION

The present invention provides a novel, adjustable cutting board apparatus composed of a board and a base stand pivotally mounted thereto, the apparatus being configurable between a horizontal cutting configuration and a vertical standing configuration.

The board has a front surface, an opposed back surface and a peripheral edge surface. The peripheral edge surface further includes a cutout region defining two co-terminal base legs; wherein a portion of the peripheral edge surface in the cutout region includes a concave contour edge surface that has a uniform radius of curvature.

The base stand is configured and dimensioned to be receivable and rotatably mountable in a mated relationship within the cutout region and between the defined legs. The stand includes a front surface, an opposed back surface and a peripheral edge surface. The peripheral edge surface includes a convex contour edge surface and a base surface. The convex contour edge surface of the base stand has the same radius of curvature as the concave contour edge surface of the board and the base surface is co-extensive with the base legs of the board.

When the cutting board apparatus is in a cutting configuration, the concave contoured edge surface of the board is in mating contact with the convex contoured edge surface of the base stand, wherein the front and back surfaces of the base stand are co-extensive with the respective front and back surfaces of the board.

The cutting board apparatus is configurable into a standing configuration by rotating the base stand within the cutout regions so that the board and the base stand are at an angled relationship to one another such that the base surface of the base stand and the defined legs of the board together are capable of supporting the cutting board in a vertical, upright configuration for drainage, drying and/or storage.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a front elevation view of one cutting board apparatus embodiment of the present invention illustrated in cutting configuration.

FIG. 2 is an elevation view of the embodiment of FIG. 1 as seen from the right hand side thereof illustrated in vertical standing configuration.

FIG. 3 is a perspective view of the configuration illustrated in FIG. 2.

FIG. 4 is an exploded front elevation view of the base stand and connecting mechanism therefor.

FIG. 5 is a bottom elevation view of the peripheral edge surface of the board shown in FIG. 1.

FIG. 6 is a perspective view of the base stand shown in FIG. 1.

FIG. 7 is a side elevation view of the base stand shown in FIG. 6.

FIG. 8 is a perspective view of another cutting board apparatus embodiment of the present invention illustrated with the base stand in vertical standing position.

FIG. 9 is a bottom elevation view of the configuration shown in FIG. 8.

FIG. 10 is a perspective view of the base stand shown in FIG. 8.

FIG. 11 is a bottom elevation view of the board shown in FIG. 8 illustrated in cutting configuration.

DETAILED DESCRIPTION OF THE INVENTION

FIGS. 1 through 7 show cutting board apparatus 10 which is comprised of generally rectangular and generally planar board member 15 having cutting surface 16. The peripheral edge of board member 15 is generally, but not necessarily, rectangular in shape having top edge 18 and opposed and parallel bottom edge 19, both of which preferably, but not necessarily, are flat. Opposed side edges 21 and 22 interconnect top edge 18 and bottom edge 19 thereby forming a peripheral edge. Cutting surface 16 has an opposed general planar surface 17 and may be, but not necessarily, provided with recessed area 20 for the purposes of holding material to be chopped or cut, such as a small chicken, or if cutting board apparatus 10 is larger, a turkey or the like, all as well known in the food art. Recessed area 20 is shown for illustration as an oval but it may be any other convenient shape and may have a portion thereof for collecting juices, all as well known in the food art.

Bottom edge 19 is generally flat and straight but has within it an arciform, cutout region 23 defining concave contour edge surface 26 into which fits base stand 25. Concave contour edge surface 26 has a uniform radius of curvature that curves inward thereby defining cutout region 23. In this embodiment, cutout region 23 is in the shape of a segment of a circle 24. Cutout region 23 further defines first base leg 13 and second base leg 14 of board member 15.

Board member 15 of cutting board apparatus 10 and base stand 25 are constructed, dimensioned and arranged so that base stand 25 includes a generally arcuate portion 27 having a curved, arcuate edge, defining convex contour edge surface 28 and flat edged base surface 29 thereby forming peripheral edge 33. Base stand 25 further comprises front surface 30 and opposed and parallel back surface 31 that are interconnected by peripheral edge 33. Base stand 25 further includes aperture 32 therewithin. Convex contour edge surface 28 has the same uniform radius of curvature as the concave contour edge surface 26. Convex contour edge surface 28, however, curves outwards in a complementary fashion to the inward curvature of concave counter edge surface 26 thereby allowing base stand 25 to rotate within cutout region 23 without a gap between the contoured surfaces.

Base stand 25 is pivotally mounted to board member 15 by means of fastener 35 including head portion 37, shank 36 and tapped portion 38 such that base stand 25 is rotationally movable for placing board member 15 between a cutting configuration position and a vertical standing position.

In the vertical standing position, as shown in FIGS. 2 and 3, base stand 25 is pivotally moved out of the plane of board member 15, which may preferably, but not necessarily, be perpendicular to cutting surface 16 of board member 15 so as to support cutting board apparatus 10 in a generally vertical standing position to facilitate drying, draining and storage of the board.

In the cutting position, as shown in FIG. 1, base stand 25 is generally coplanar with board member 15, such that cutting surface 16 of board member 15 is coplanar with front surface 30 of base stand 25 and planar surface 17 of board member 15 is coplanar with back surface (not shown) of base stand 25 and particularly forms a generally flat planar surface. To ensure sideways stability, bottom edge 19 at first base leg 13 and second base leg 14 of board member 15 are co-extensive with base surface 29 of base stand 25.

Base stand 25 is rotated relative to cutting surface 16 of board member 15 so that cutting board apparatus 10 is configurable from a cutting position to a vertical standing position as to support same in a generally vertical position to facilitate drainage and drying. In a preferred embodiment, base stand 25 may rotate 360 degrees with respect to board member 15. This degree of rotation, however, is not required as long as base stand 25 is sufficiently rotatable to vertically support board member 15 of cutting board apparatus 10 in an upright, vertical position.

Cutting board apparatus 10 may be made out of a variety of materials, each having their own advantages and disadvantages. For instance, cutting board apparatus 10 may be made of metal, wood or plastic. Metal may be heavy but may clean easier; wood may be aesthetically pleasing but bacteria and other undesirable organic micro-organisms are easily retained thereon; and plastic may be lighter and less expensive but may or may not be as aesthetically pleasing, as for instance wood. The preferred material of the subject invention is an acrylic or polyacrylene since it is inexpensive, light weight and easily cleaned. In a preferred embodiment, board member 15 and base stand 25 of cutting board apparatus 10 are composed of the same material. Alternatively, however, they may be composed of different materials.

Cutting board apparatus 10 as illustrated is generally rectangular in plan view but may be oval or any other shape which lends itself to the use of base stand 25 for generally supporting the board in a vertical standing position to facilitate drainage and frequent washing, drying and storage. The present invention provides the consumer with an easy way to drain the cutting board after washing to facilitate the healthier use of the cutting board in the home.

Although illustrated in FIG. 4 with fastener 35, the fastening mechanism may be a variety of different types including a bearing and shaft to facilitate rotation of base stand 25 with respect to board member 15. The fastening mechanism could be any device that mechanically joins base stand 25 to board member 15 in a manner that allows these components to rotate with respect to each other. Alternate fasteners, include but are not limited to, a bolt and screw combination, a cotter pin, a screw, a "snap-fit" type fastener, and the like.

An alternative embodiment is shown in FIGS. 8-11. In this embodiment, cutting board apparatus 60 includes board member 40 and base stand 50.

Board member 40 includes front surface 41 and opposed back surface 42. In a preferred embodiment, front surface 41 and opposed back surface 42 are flat. In other embodiments, however, this is not required. For example, front surface 41 could further include an indention similar to the one shown in FIG. 1. Front surface 41 and opposed back surface 42 are connected together by peripheral edge surface 43. A portion of peripheral edge surface 43 includes cutout region 64 thereby defining first base leg 44 and second base leg 45. In the illustrated embodiment, peripheral edge surface 43 is flat except in cutout region 64. In other embodiments, the peripheral edge surface may be beveled.

Cutout region 64 further comprises flat top edge 65, first side edge 66, and second side edge 67. First side edge 66 and second side edge 67 further comprise first concave contour side edge surface 68 and second concave contour side edge surface 69, respectively. First concave contour side surface 68 and second concave contour side edge 69 surface extend between front surface 41 and back surface 42 of standing base 40 and curve inward with a uniform radius of curvature.

In the preferred illustrated embodiment, the shape of cutout region 64 is a rectangle, wherein flat top edge 65 is perpendicular to first side edge 66 and opposed, parallel second side edge 67 and is longer than both respective side edges. In other embodiments, the shape of the cutout region can vary as long as each side edge includes a concave contour curved edge surface with a uniform radius of curvature. Alternate shapes of the cutout region, include but are not limited to, a square or a trapezoid.

Base stand 50 is configured and dimensioned to be receivable and rotatably mountable in a mated relationship within cutout region 64. Base stand 50 comprises flat top edge surface 54, flat opposed and parallel base stand edge surface 59, flat front surface 51, and flat opposed and parallel back surface 52. Front surface 51 and back surface 52 are interconnected by base stand peripheral edge surface 53. Base stand peripheral edge surface 53 further comprises first side edge surface 55 and opposing second side edge surface 56 positioned perpendicular to flat top edge surface 54 and flat base edge surface 59. First edge surface 55 and second side edge surface 56 further comprise first convex contour side edge surface 57 and second convex contour side edge surface 58, respectively. Each convex contour side edge surface has a uniform radius of curvature that is the same as the uniform radius of curvature corresponding to respective concave contour side edge surfaces. The convex contour side edge surfaces, however, curve inwardly thereby allowing first convex contour side edge surface 58 of base stand 50 to mate with first concave contour side edge surface 68 of board member 40, and second convex contour side edge surface 59 of base stand 50 to mate with the second concave contour side edge surface 69 of board member 40. Base stand 50 further comprises aperture 61 similar to aperture 32 described in the previous embodiment.

Base stand 50 is pivotally mounted to board member 40 by a fastener as described in reference to FIGS. 1 through 4, such that cutting board apparatus 60 can be configured in both a horizontal cutting configuration and an upright, vertical standing configuration.

As shown in FIG. 11, when cutting board apparatus 60 is in a cutting configuration, the components are rotated such that front surface 41 of board member 40 is coplanar with front surface 51 of base stand 50, and back surface 42 of board member 40 is coplanar with back surface 52 of base stand 50. As can be appreciated from this perspective, the concave contour side edge surfaces of the board member are tightly mated with the convex contour side edge surfaces of the base stand so that food particles cannot pass between them.

As also illustrated in FIGS. 9 and 11, cutting board apparatus 60 of this invention can further comprise non-skid portions 49 on the base edge surfaces of first base leg 44, second base leg 45 and base stand edge surface 59. The non-skid portions are preferably composed of non-skid material, including but not limited to, rubber, silicone, vinyl, and the like. The non-skid portions may be a textured material affixed to one or more of the bottom edge surfaces. Alternatively, the non-skid portions may be integrally formed in the bottom edge surfaces, such as by scoring, etching, molding, and the like. For example, the non-skid portion may be molded, carved or scored on at least one of the edge surfaces of first base leg 44, second base leg 45 and base stand edge surface 59.

FIG. 8 illustrates cutting board apparatus 60 in an upright, vertical standing configuration. In this configuration, base stand 50 is rotated with respect to board member 40 so that base stand 50 and board member 40 are in an angled relationship to each other such that base stand edge surface 59 of base stand 50 and first and second base legs, 44 and 45, of board member 40 are capable of supporting cutting board apparatus 60 in an upright, vertical standing configuration. In a preferred embodiment, base stand 50 can rotate 360 degrees within cutout region 64 of standing base 40. Such rotation, however, is not required as long as the angle between board member 40 and base stand 50 is such that they are capable of supporting cutting board apparatus 60 in an upright configuration.

The cutting board apparatus 60 can be composed of material similar to that described in reference to the embodiment disclosed in FIGS. 1-7.

The foregoing descriptions and the accompanying drawings are illustrative of the present invention. Still other variations and arrangements of parts are possible without departing from the spirit and scope of the invention. Further, the invention consists of certain novel features and a combination of parts herein fully described, illustrated in the accompanying drawings, and particularly pointed out in the appended claims, it being understood that various changes in the details may be made to one or more of these features without departing from the spirit or sacrificing any of the advantages of the present invention.

What is claimed is:

1. An adjustable cutting board apparatus comprising:
a board having a front surface, an opposed back surface, and a peripheral edge surface, a portion of the peripheral edge surface including a cutout region defining two co-terminal base legs; the portion of the peripheral edge surface in the cutout region including a concave contoured edge surface having a defined, uniform radius of curvature;
a stand configured and dimensioned to be receivable and rotatably mountable in mated relationship with the cutout region, the stand having a front surface, an opposed back surface, and a peripheral edge surface; a portion of the peripheral edge surface including a base surface and a portion of the peripheral edge surface having a convex contoured edge surface defined thereon, the convex contoured edge surface having the same uniform radius of curvature as the concave contoured edge surface in the cutout region;
the stand being sized and shaped such that, when the cutting board is configured for cutting use, the concave contoured edge surface of the cutout in the cutout region is in mating contact with the convex contoured edge surface of the stand, the front and back surfaces of the stand being co-extensive with the respective front and back surfaces of the board in the area of the cutout region; and,
wherein the stand is adjustably rotatable within the cutout region to dispose the board and the stand at an angled relationship to one another such that the base surface of the stand and the base legs are co-extensive with one another and together are capable of supporting the cutting board in an upright, vertical standing configuration.

2. The adjustable cutting board of claim 1 wherein the stand is rotatably secured to the board by a fastener.

3. The adjustable cutting board of claim 1 wherein the stand is configured and dimensioned so that it can rotate 360 degrees with respect to the board.

4. The adjustable cutting board of claim 1 wherein the board and the stand are composed of material selected from the group consisting of wood, plastic, metal, acrylic and polyacrylene.

5. The adjustable cutting board of claim 1 wherein the shape of the cutout region and stand are selected from the group consisting of an arch, a rectangle, a square and a trapezoid.

6. The adjustable cutting board of claim 1 wherein the front surface of the board includes an indention.

7. The adjustable cutting board of claim 1 wherein the two base legs of the board and the base surface of the stand include at least one non-skid portion.

8. An adjustable cutting board apparatus comprising:
a board having a front surface, an opposed back surface, and a peripheral edge surface, a portion of the peripheral edge surface including an arciform cutout region having a concave contoured edge surface to define a standing base having two co-terminal base legs; the arciform cutout region being in the shape of a segment of a circle having a defined uniform radius of curvature; the entire concave contoured edge surface in the arciform cutout region including a concave contour having the same radius of curvature as the shape of the segment of the cutout region;
a stand configured and dimensioned to be receivable and rotatably mountable in mated relationship with the cutout region, the stand having a front surface, an opposed back surface, and a peripheral edge surface; a portion of the edge surface including a base surface and the remaining portion of the edge surface defining a uniform arch having a convex contoured edge surface defined along its entire length, the convex contoured edge surface being complementary to and having the same uniform radius of curvature as the concave contoured edge surface in the arciform cutout region;

the stand being sized and shaped such that, when the cutting board is configured for cutting use, the concave contoured edge surface in the cutout region is in mating contact with the convex contoured edge surface of the stand, the front and back surfaces of the stand being co-extensive with the respective front and back surfaces of the board in the area of the cutout region; and, wherein the stand is adjustably rotatable within the cutout region to dispose the board and the stand at an angled relationship to one another such that the base surface of the stand and the base legs are co-extensive with one another and together are capable of supporting the cutting board in an upright, vertical standing configuration.

9. The adjustable cutting board of claim 8 wherein the stand is configured and dimensioned so that it can rotate 360 degrees with respect to the board.

10. The adjustable cutting board of claim 8 wherein the board and the stand are composed of material selected from the group consisting of wood, plastic, metal, acrylic and polyacrylene.

11. The adjustable cutting board of claim 8 wherein the two base legs of the board and the base surface of the stand include at least one non-skid portion.

12. An adjustable cutting board apparatus comprising:

a board having a front surface, an opposed back surface, and a peripheral edge surface, a portion of the peripheral edge surface including a rectangular cutout region defining two co-terminal base legs; the portion of the peripheral edge surface in the cutout region including a straight, flat top edge surface, and a side edge surface at each end of the top edge surface and perpendicular thereto, each of the side edge surfaces including a concave contoured side edge surface having a defined, uniform radius of curvature;

a stand configured and dimensioned to be receivable and rotatably mountable in mated relationship with the cutout region, the stand having a front surface, an opposed back surface, and a peripheral edge surface; the peripheral edge surface including a flat top edge surface, a side edge surface at each end of the top edge surface and perpendicular thereto, and a base edge surface opposite the top edge surface; each of the side edge surfaces including a convex contoured side edge surface defined thereon having the same uniform radius of curvature as the radius of curvature of the concave contoured side edge surfaces in the cutout region;

the stand being sized and shaped such that, when the cutting board is configured for cutting use, each of the concave contoured side edge surfaces in the cutout region is in mating contact with a complementary convex contoured side edge surface of the stand, the front and back surfaces of the stand being co-extensive with the respective front and back surfaces of the board in the area of the cutout region; and, wherein the stand is adjustably rotatable within the cutout region to dispose the board and the stand at an angled relationship to one another such that the base surface of the stand and the base legs are co-extensive with one another and are capable of supporting the cutting board in an upright configuration.

13. The adjustable cutting board of claim 12 wherein the stand is configured and dimensioned so that it can rotate 360 degrees with respect to the board.

14. The adjustable cutting board of claim 12 wherein the board and the stand are composed of material selected from the group consisting of wood, plastic, metal, acrylic and polyacrylene.

15. The adjustable cutting board of claim 12 wherein the two base legs of the board and the base surface of the stand include at least one non-skid portion.

\* \* \* \* \*